United States Patent
Sarikaya et al.

(10) Patent No.: US 7,315,519 B2
(45) Date of Patent: Jan. 1, 2008

(54) IPV4/V6 ADDRESS ACQUISITION TECHNIQUES FOR MOBILE TERMINALS OPERATING WITHIN WIRELESS LANS

(75) Inventors: Behcet Sarikaya, Plano, TX (US); Timucin Ozugur, Garland, TX (US)

(73) Assignee: Alcatel Lucent, Paris (FR)

( * ) Notice: Subject to any disclaimer, the term of this patent is extended or adjusted under 35 U.S.C. 154(b) by 932 days.

(21) Appl. No.: 10/634,591

(22) Filed: Aug. 5, 2003

(65) Prior Publication Data

US 2005/0030945 A1    Feb. 10, 2005

(51) Int. Cl.
*H04B 7/00* (2006.01)
(52) U.S. Cl. ...................................... 370/310
(58) Field of Classification Search ........ 370/310–331, 370/345, 349, 338; 709/220, 221, 227, 230, 709/238, 245, 249
See application file for complete search history.

(56) References Cited

U.S. PATENT DOCUMENTS

| | | | |
|---|---|---|---|
| 6,501,746 B1 * | 12/2002 | Leung | 370/338 |
| 6,850,503 B2 * | 2/2005 | Dorenbosch et al. | 370/331 |
| 2002/0154613 A1 * | 10/2002 | Shahrier | 370/331 |
| 2004/0202120 A1 * | 10/2004 | Hanson | 370/328 |
| 2004/0213260 A1 * | 10/2004 | Leung et al. | 370/395.3 |

OTHER PUBLICATIONS

Ozugur, Fast IPv4/IPv6 address acquisition in wireless LANs, IEEE, Jan. 2004, pp. 193-198.*
EPO search report, EP 04 01 7186, Nov. 2004, one page.*

* cited by examiner

*Primary Examiner*—Dmitry Levitan
(74) *Attorney, Agent, or Firm*—Conley, Rose & Tayon; Bobby D. Slaton; Jessica W. Smith

(57) ABSTRACT

Disclosed herein are techniques by which a Layer-2 entity determines whether a mobile terminal requesting association or reassociation therewith determines whether the requesting mobile terminal shall continue using its current IP address or whether it requires a new IP address. The Layer-2 entity makes this determination based upon an examination of the contents of the association or reassociation request message received thereby. Contained in the association or reassociation reply message returned by the Layer-2 entity shall either be an instruction, to the mobile terminal, to continue using its current IP address or a new IP address to be used, by the mobile terminal in place of its current IP address.

12 Claims, 3 Drawing Sheets

IPV4/V6 ADDRESS ACQUISITION TECHNIQUES FOR MOBILE TERMINALS OPERATING WITHIN WIRELESS LANS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is directed to wireless local area networks ("WLANs") and, more particularly, to an address acquisition technique for use by mobile Layer-2 entities operating in WLANs. By encapsulating Internet protocol ("IP") address assignments in 802.11 WLAN association services, mobile Layer-2 entities generate less network traffic and consume less power.

BACKGROUND OF THE INVENTION

In recent years, the number of mobile terminals, for example, laptop computers, digital cellular phones and personal digital assistants ("PDAs") connected to the Internet has increased dramatically. Together with the increasing number of intelligent mobile terminals has come increased interest in the delivery of IP data and services to such devices. There are, however, certain problems when attempting to deliver IP data to mobile terminals. One problem relates to the current techniques used to assign IP addresses to mobile terminals. More specifically, the current IP address assignment procedure cannot determine whether or not a mobile terminal has roamed into a new domain. As a result, the current address assignment procedure requires that a mobile terminal must change its IP address every time it registers to a new access point ("AP"). In that a new IP address must be generated for a mobile terminal even if it has remained in the same IP domain, the aforementioned procedure represents an inefficient use of signaling resources. Furthermore, the need to repeatedly acquire new IP addresses results in increased power consumption by the mobile terminal. In turn, the increased power consumption will lead to shorter battery lifetimes and service access times for the mobile terminal. It is, therefore, the object of this invention to enhance the efficiency of the process by which an IP address is assigned to a mobile terminal.

SUMMARY OF THE INVENTION

In various embodiments thereof, the present invention is directed to a method for assigning an IP address to a mobile terminal upon entering a basic service area ("BSA") served by a Layer-2 entity. In accordance with these methods, the Layer-2 entity determines, on behalf of the mobile terminal, whether the mobile terminal should continue using a current IP address or begin using a new IP address. If the Layer-2 entity determines that the mobile terminal should continue using the current IP address, the Layer-2 entity shall issue an instruction, to the mobile terminal, to continue using the current IP address. Conversely, if the Layer-2 entity determines that the mobile terminal should begin using a new IP address, the Layer-2 entity shall acquire the needed IP address from a Layer-3 entity.

DETAILED DESCRIPTION OF THE INVENTION

Figure 1:
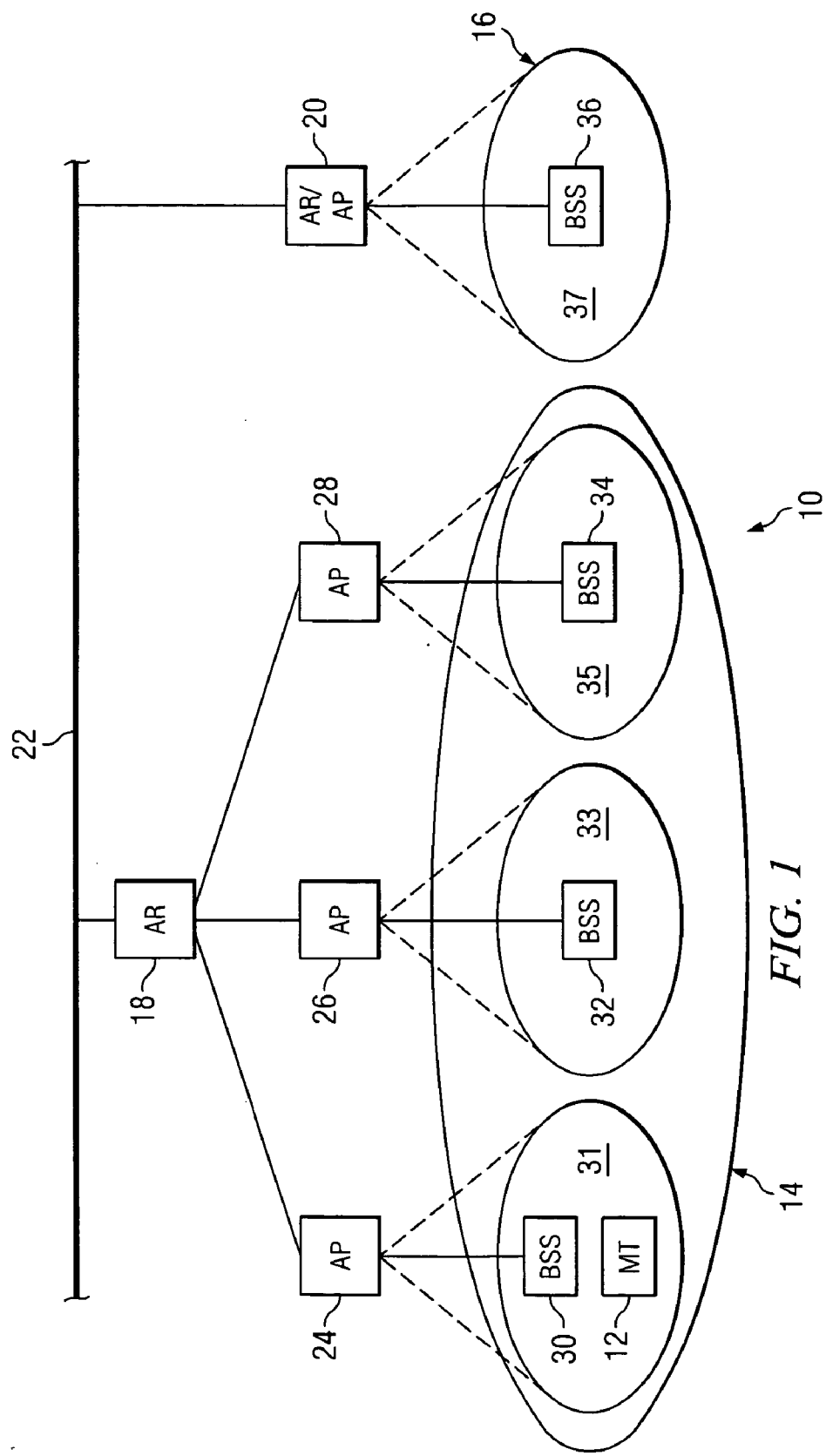
FIG. 1 is a block diagram of a WLAN within which a mobile terminal may operate.

Referring now to FIG. 1, a WLAN 10 within which a mobile terminal 12 may operate will now be described in greater detail. As disclosed herein, the WLAN 10 is configured to comply with IEEE Standard 802.11. However, it is specifically contemplated that 802.11 non-compliant WLANs may also be suitable for the uses contemplated herein. The WLAN 10 is comprised of first and second IP domains 14 and 16. Of course, it is fully contemplated that the WLAN 10 may instead be comprised of any number of IP domains and that the current disclosure of the WLAN 10 as being comprised of the first and second IP domains 14 and 16 is purely by way of example. An IP domain is a Layer-3 domain and may include any number of APs and basic service sets ("BSSs"). For example, the first IP domain 14 includes first, second and third APs 24, 26 and 28 and first, second and third BSSs 30, 32 and 34 coupled to the first, second and third APs 24, 26 and 28, respectively. A BSS is a Layer-2 domain, the members of which may communicate within a geographical area known as a basic service area ("BSA"). Thus, the members of the first, second and third BSSs 30, 32 and 34 may communicate within first, second and third BSAs 31, 33 and 35, respectively. Each IP domain is served by a single access router ("AR"). Again, for example, the first IP domain 14 is served by an AR 18 coupled to each of the first, second and third APs 24, 26 and 28.

In contrast with the first IP domain 14, the second IP domain 16 includes a single BSS 36, the members of which may communicate within a BSA 37. Accordingly, the second IP domain 16 is served by a single AP, which, since the second IP domain 16 includes only a single BSS 36 and a single AP, also serves as an AR, and is, therefore, known as a collocated AR/AP 20. Finally, the AR 18 is coupled to the collocated AR/AP 20 by a distribution system 22. Variously, the distribution system 22 may be a wireline distribution system, a wireless distribution system or a combination thereof. Of course, the AR 18 and the collocated AR/AP 20 need not be coupled to one another by the distribution system 22, in which case the first IP domain 14 would define a first WLAN and the second IP domain would define a second WLAN.

When a mobile terminal, for example, mobile terminal 12, enters the coverage area for an IEEE Standard 802.11 compliant WLAN, for example, the WLAN 10, the mobile terminal is required to register with the AP serving the BSS for which the mobile terminal had entered the coverage area. For example, as illustrated in FIG. 1, the mobile terminal 12 has entered the BSA 31 and must, therefore, register with the AP 24 serving the BSS 30. Similarly, when the mobile terminal 12 enters the coverage area for another BSS within the WLAN 10, for example, when the mobile terminal 12 enters the BSA 33, the mobile terminal 12 is required to register with the AP 26 serving the BSS 32.

Association and reassociation are Layer-2 services, defined by IEEE Standard 802.11, used to register a mobile terminal with an AP. The association and reassociation services are managed by the AP using Layer-2 medium access control ("MAC") addresses. As roaming between APs has traditionally been managed by Layer-2 protocols, when a mobile terminal associates with a new AP, the mobile terminal will not know if it has changed its IP domain. To solve this problem, in the past, the mobile terminal would be assigned a new IP address whenever the mobile terminal changes BSSs. This entailed signaling to the AR, the Layer-3 entity which processes all IP addressing procedures, even if the mobile terminal had not moved outside its original IP domain. In contrast with the foregoing technique, which required signaling to the Layer-3 entity in order for the mobile terminal to acquire a new IP address regardless of whether a change in IP domain had in fact occurred, the present invention is directed to a method for assigning an IP address to a mobile terminal in which a Layer-2 entity determines, on behalf of the mobile terminal, whether the mobile terminal may continue using a current IP address or must begin using a new IP address. By utilizing a Layer-2 entity to make such a determination on behalf of the mobile terminal, it is contemplated that signaling requirements between the various components of the WLAN shall be reduced.

Figure 2:
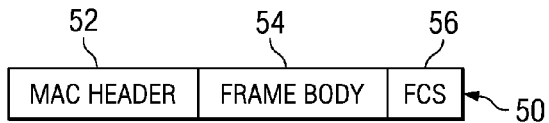
FIG. 2A illustrates a frame body for an association request message suitable for use with a method of acquiring an IP address in accordance with the teachings of the present invention.
FIG. 2B illustrates a frame body for an association response message suitable for use with the method of acquiring an IP address in accordance with the teachings of the present invention.
FIG. 2C illustrates a frame body for a reassociation request message suitable for use with the method of acquiring an IP address in accordance with the teachings of the present invention.
FIGS. 2D-2E illustrate a frame body for a reassociation response message in accordance with the teachings of the present invention.

While a full discussion of the standard is beyond the scope of the present application, in accordance with IEEE Std. 802.11, messages exchanged between the various components of the WLAN 10 are arranged in a pre-defined MAC frame format which may be best seen in FIG. 2A. As may now be seen, a message frame 50 is comprised of a MAC header 52, a frame body 54 and a frame check sequence ("FCS") 56. The MAC header 52 includes frame control, duration, address and sequence control information for the message frame 50. As will be more fully described below, the contents of the frame body 52 varies depending on the particular type of message being carried in the message frame 52. Finally, the FCS 56 contains an IEEE 32-bit cyclic redundancy code ("CRC").

FIG. 2B illustrates a frame body 60 for an association request message. An association request message is issued by a mobile terminal upon entering a BSA serviced by a new AP. As shown in FIG. 2B, the frame body 60 for an association request message includes a capability information field 64, a listen interval field 66, a SSID field 68, a supported rates field 70, a mobile IP bit field 72 and a current IP address field 74. The capability information field 64 contains a number of subfields that are used to indicate requested or advertised capabilities. Typically, the subfields included in the capability information field 64 are an extended service set ("ESS") subfield, an independent basic service set ("IBSS") subfield, a contention free ("CF")-pollable subfield, a CF-poll request subfield and a privacy subfield. The listen interval field 66 is used to indicate, to the AP, how often a mobile terminal awakes to listen to Beacon management frames. The service set identity ("SSID") field 68 indicates the identity of an ESS or an IBSS. The supported rates field 70 specifies the rates in the operational rate set as described in the MLME_Join.request and MLME_Start.request primitives. The mobile IP bit field 72 is a 1-bit field which is enabled if the mobile terminal is a mobile IPv4 client or a mobile IPv6 client. Conversely, the mobile IP bit field 72 is not enabled if the mobile terminal is an IPv4 client or an IPv6 client. Finally, the current IP address field 74 contains a current IP address for the mobile terminal requesting association. To support IPv6, it is contemplated that the current IP address field 74 must be 128-bits.

FIG. 2C illustrates a frame body 76 for an association reply message. An association reply message is issued by an AP in response to receipt of an association request message issued by a mobile terminal. As shown in FIG. 2C, the frame body 76 for an association message includes a capability information field 78, a status code field 80, an association ID field 82, a supported rates field 84 and an IP address field 86. The capability information and supported rates fields 78 and 84 were previously described. The status code field 80 indicates the success or failure of a requested operation. The association ID field 82 is a value assigned by an AP during association that represents the 16-bit ID of the mobile terminal requesting association. Finally, the IP address field 86 will either provide a new IP address for the mobile terminal requesting association or advise the mobile terminal requesting association to continue to use the current IP address.

FIG. 2D illustrates a frame body 88 for a reassociation message. A reassociation message is issued by a mobile terminal during the transfer of an established association from one AP to either another AP or the same AP. As shown in FIG. 2D, the frame body 88 for a reassociation message includes a capability information field 90, a listen interval field 92, a current AP address field 94, a SSID field 98, a supported rates field 98, a mobile IP bit field 100 and a current IP address field 102. The capability information, listen interval, SSID and supported rates fields 90, 92, 96 and 98 were previously described. The current AP address field 94 contains the MAC address of the AP with which the mobile terminal issuing the reassociation request is currently associated. The mobile IP bit field 100 is a 1-bit field which is enabled if the mobile terminal is a mobile IPv4 client or a mobile IPv6 client. Conversely, the mobile IP bit field 100 is not enabled if the mobile terminal is an IPv4 client or an IPv6 client. Finally, the current IP address field 102 contains a current IP address for the mobile terminal issuing the reassociation request. To support IPv6, the current IP address field 102 must be 128-bits.

FIG. 2E illustrates a frame body 104 for a reassociation reply message. A reassociation reply message is issued by an AP in response to receipt of a reassociation request message issued by a mobile terminal. As shown in FIG. 2E, the frame body 104 for a reassociation reply message includes a capability information field 106, a status code field 108, an association ID field 110, a supported rates field 112 and an IP address field 114. The capability information, status code, association ID and supported rates fields 106, 108 110 and 112 were previously described. The IP address field 114 will either provide a new IP address for the mobile terminal requesting reassociation or advise the mobile terminal requesting reassociation to continue to use the current IP address.

Figure 3:
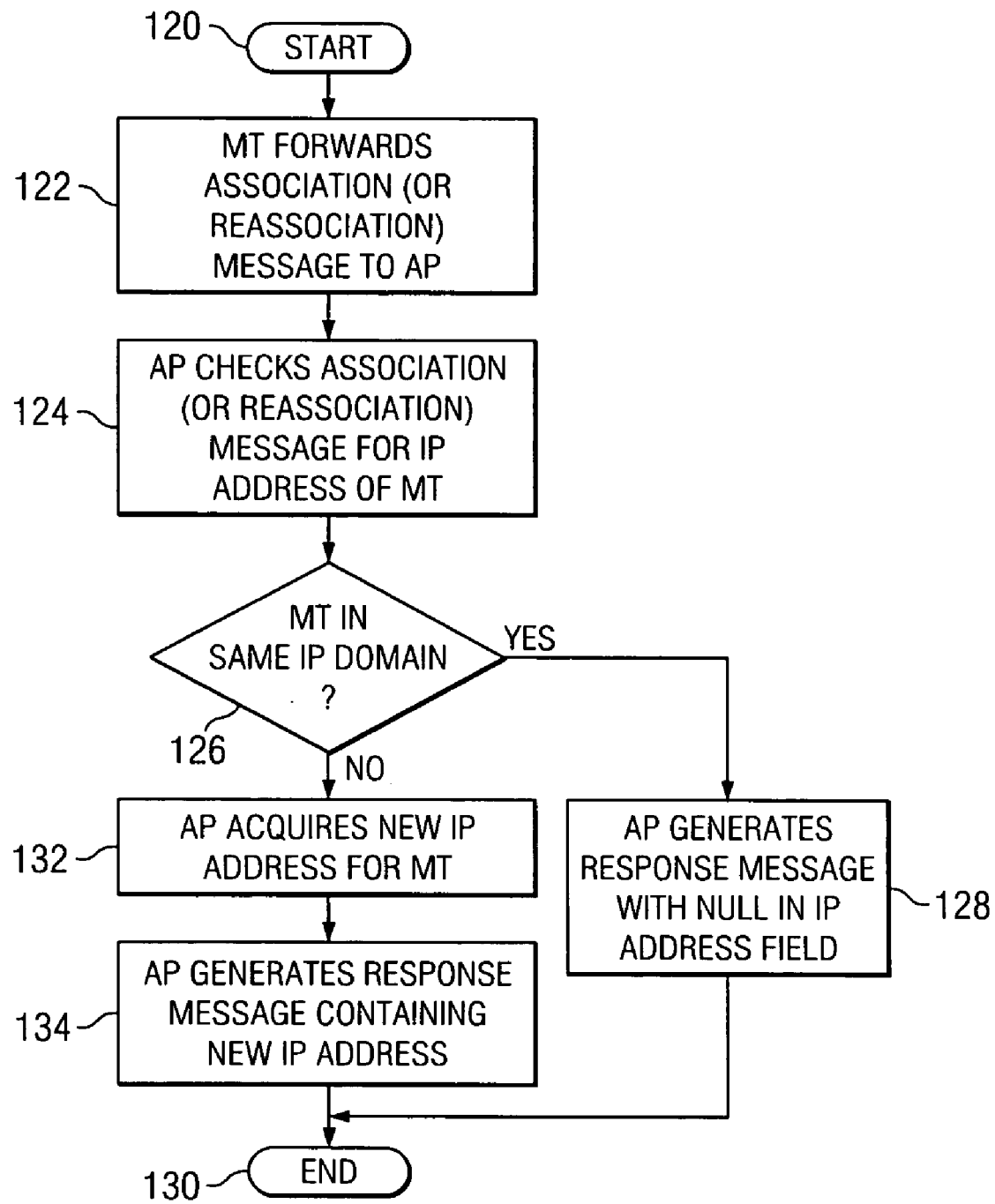
FIG. 3 is a flowchart of a method for acquisition of an IP address by a mobile terminal.

Referring next to FIG. 3, the method by which a mobile terminal, for example, the mobile terminal 12, will either: (1) acquire a new IP address; or (2) receive instructions to continue using a current IP address; from a level-2 entity, for example, the AP 24, in accordance with the teachings of the present invention shall now be described in greater detail. In the description which immediately follows, it is presumed that the mobile terminal 12 is operating in an IPv4 environment. Subsequent passages, however, will address the operation of the mobile terminal 12 in other IP environments, for example, MIPv4, IPv6 or MIPv6.

The method commences at step 120 with the AP 24 having knowledge of its IP address, the mobile terminal 12 having knowledge of its IP address and the mobile terminal 12 initiating construction of either an association request message similar to that illustrated in FIGS. 2A and 2B or a reassociation request message similar to that illustrated in FIGS. 2A and 2D. By constructing an association request message or a reassociation request message in accordance with the format previously described, the association request message or reassociation request message shall contain the IP address of the mobile terminal 12 in the current IP address field thereof while the mobile IP bit field will not be enabled.

The method then proceeds to step 122 where the mobile terminal 12 forwards the constructed association request message or reassociation request message to the AP 24. Continuing on to step 124, the AP 24 determines the current IP address of the mobile terminal 12 by checking the current IP address field 74 of the received association request message or the current IP address field 102 of the received reassociation request message. At step 126, the AP 24 determines whether the mobile terminal 12 has roamed into a new IP domain. To do so, the AP 24 compares the current IP address of the mobile terminal 12 received as part of the association request message or reassociation request message to the IP address for the AP 24. If the addresses match, the AP 24 determines that the mobile terminal 12 has stayed in its prior IP domain and that a new IP address is not necessary. Accordingly, the method will proceed to step 128 where the AP 24 generates an association response message similar to that illustrated in FIGS. 2A and 2C or a reassociation response message similar to that illustrated in FIGS. 2A and 2E. In generating the association response message or the reassociation response message at step 128, the AP 24 will insert a NULL into either the IP address field 86 of the association response message or the IP address field 114 of the reassociation response message. Upon receiving the association response message or the reassociation response message, the mobile terminal 12 will examine the contents of the IP address field 86 or the IP address field 114 and, if the mobile terminal 12 detects a NULL inserted into the IP address field 86 of the association response message or the IP address field 114 of the reassociation response message, the mobile terminal 12 will conclude that it has remained in its prior IP domain and that it may, therefore, continue using its current IP address. The mobile terminal 12 having determined, at step 128, that it may continue to use its current IP address, the method would then end at step 130.

Returning to step 126, if, however, it is determined by the AP 24 that the current IP address of the mobile terminal 12 received as part of the association request message or reassociation request message does not match the IP address for the AP 24, the AP 24 concludes that the mobile terminal 12 has changed IP domains and needs a new IP address. The method will then proceed to step 132 where the AP 24 acquires a new IP address for the mobile terminal 12. To do so, the AP 24 will first check the mobile IP bit field 72 or 100 to determine if the mobile terminal is a mobile IPv4 client. As the mobile IP bit field 72 or 100 is not enabled, the mobile terminal 12 is operating in an IPv4 environment. Accordingly, in order to acquire a new IP address for the mobile terminal 12, the AP 24 issues a request for a new IP address to the dynamic host configuration protocol ("DHCP") server (not shown) which resides within the AR 18, the level-3 entity responsible for assigning IP addresses in IPv4. In turn, the DHCP server will issue a reply message to the AP 24 which contains a new IP address for the mobile terminal 12. Upon receipt of the reply message from the DHCP server, the method proceeds to step 134 where AP 24 generates an association response message similar to that illustrated in FIGS. 2A and 2C or a reassociation response message similar to that illustrated in FIGS. 2A and 2E. In generating the association response message or the reassociation response message at step 134, the AP 24 will insert the IP address received from the DHCP server into either the IP address field 86 of the association response message or the IP address field 114 of the reassociation response message. The AP 24 will then forward the association response message or the reassociation response message to the mobile terminal 12. Upon examining the received association response message or reassociation response message and determining that an IP address was inserted into the IP address field 86 of the association response message or the IP address field 114 of the reassociation response message, the mobile terminal 12 will determine that it has changed IP domains and must discontinue usage of its current IP address in favor of the IP address received in the association response message or reassociation response message. The mobile terminal 12 having commenced usage of the newly received IP address, the method would then end at step 130.

The foregoing method will now be described again, this time presuming that the mobile terminal is operating in an MIPv4 environment in which IP addresses are assigned by a foreign agent ("FA"), typically a FA collocated with the AR for that IP domain, if the mobile terminal roams into the FA area. As before, the method commences at step 120 with the AP 24 having knowledge of its IP address, the mobile terminal 12 having knowledge of its IP address and the mobile terminal 12 initiating construction of either an association request message similar to that illustrated in FIGS. 2A and 2B or a reassociation request message similar to that illustrated in FIGS. 2A and 2D. By constructing an association request message or a reassociation request message in accordance with the format previously described, the association request message or reassociation request message shall contain the IP address of the mobile terminal 12 in the current IP address field 74 or 102 thereof while the mobile IP bit field 72 or 100 will be enabled.

The method then proceeds to step 122 where the mobile terminal 12 forwards the constructed association request message or reassociation request message to the AP 24. Continuing on to step 124, the AP 24 determines the current IP address of the mobile terminal 12 by checking the current IP address field 74 of the received association request message or the current IP address field 102 of the received reassociation request message. At step 126, the AP 24 determines whether the mobile terminal 12 has roamed into a new IP domain. To do so, the AP 24 compares the current IP address of the mobile terminal 12 received as part of the association request message or reassociation request message to the IP address for the AP 24. If the addresses match, the AP 24 determines that the mobile terminal 12 has stayed in its prior IP domain and that a new IP address is not necessary. Accordingly, the method will proceed to step 128 where the AP 24 generates an association response message similar to that illustrated in FIGS. 2A and 2C or a reassociation response message similar to that illustrated in FIGS. 2A and 2E. In generating the association response message or the reassociation response message at step 128, the AP 24 will again insert a NULL into either the IP address field 86 of the association response message or the IP address field 114 of the reassociation response message. Upon detecting the NULL inserted into the IP address field 86 of the association response message or the IP address field 114 of the reassociation response message, the mobile terminal 12 will determine that it has remained in its prior IP domain and may continue to use its current, IP address. The mobile terminal 12 having determined, at step 128, that it may continue to use its current IP address, the method would then end at step 130.

Returning to step 126, if, however, it is determined by the AP that the current IP address of the mobile terminal 12 received as part of the association request message or reassociation request message does not match the IP address for the AP 24, the AP 24 determines that the mobile terminal 12 has changed IP domains and needs a new IP address. The method will then proceed to step 132 where the AP 24 acquires a new IP address for the mobile terminal 12. To do so, the AP 24 will first check the mobile IP bit field 72 or 100 to determine if the mobile terminal is a mobile IPv4 client. As the mobile IP bit field 72 or 100 is enabled, the mobile terminal 12 is operating in an IPv4 environment. Accordingly, in order to acquire a new IP address for the mobile terminal 12, the AP 24 issues a request for a new IP address to the FA—the Layer-3 entity responsible for assignment IP addresses in MIPv4—collocated with the AR 18. In turn, the FA will issue a reply message to the AP 24 which contains the new IP address for the mobile terminal 12. Upon receipt of the reply message from the FA, the method proceeds to step 134 where AP 24 designates the received IP address as a care-of-address ("CoA") for the mobile terminal 12 and subsequently generates an association response message similar to that illustrated in FIGS. 2A and 2C or a reassociation response message similar to that illustrated in FIGS. 2A and 2E. In generating the association response message or the reassociation response message at step 134, the AP 24 will insert the CoA address received from the FA into either the IP address field 86 of the association response message or the IP address field 114 of the reassociation response message. The AP 24 will then forward the association response message or the reassociation response message to the mobile terminal 12. Upon examining the received association response message or reassociation response message and determining that an IP address was inserted into the IP address field 86 of the association response message or the IP address field 114 of the reassociation response message, the mobile terminal 12 will determine that it has changed IP domains and must discontinue usage of its current IP address in favor of the IP address received in the association response message or reassociation response message. The mobile terminal 12 having commenced usage of the newly received IP address, the method would then end at step 130.

The foregoing method will now be described yet again, this time presuming that the mobile terminal is operating in an IPv6 environment in which a mobile terminal would normally assign its own IP address using the domain prefix and its MAC address and then verify it using the duplicate address detection ("DAD") procedure. Due to the "hidden mobile terminal" problem which exists in WLAN environments, however, mobile terminals have been unable to verify their IP address. As a result, in IPv6 environments, it has been necessary to turn off the mobile terminal's IP address autoconfiguration. However, the method described herein enables IP address acquisition in IPv6 without the need of the DAD procedure. As before, the method commences at step 120 with the AP 24 having knowledge of its IP address, the mobile terminal 12 having knowledge of its IP address and the mobile terminal 12 initiating construction of either an association request message similar to that illustrated in FIGS. 2A and 2B or a reassociation request message similar to that illustrated in FIGS. 2A and 2D. By constructing an association request message or a reassociation request message in accordance with the format previously described, the association request message or reassociation request message shall contain the IP address of the mobile terminal 12 in the current IP address field 74 or 102 thereof while the mobile IP bit field 72 or 100 will not be enabled.

The method then proceeds to step 122 where the mobile terminal 12 forwards the constructed association request message or reassociation request message to the AP 24. Continuing on to step 124, the AP 24 determines the current IP address of the mobile terminal 12 by checking the current IP address field 74 of the received association request message or the current IP address field 102 of the received reassociation request message. At step 126, the AP 24 determines whether the mobile terminal 12 has roamed into a new IP domain. To do so, the AP 24 compares the current IP address of the mobile terminal 12 received as part of the association request message or reassociation request message to the IP address for the AP 24. If the addresses match, the AP 24 determines that the mobile terminal 12 has stayed in its prior IP domain and that a new IP address is not necessary. Accordingly, the method will proceed to step 128 where the AP 24 generates an association response message similar to that illustrated in FIGS. 2A and 2C or a reassociation response message similar to that illustrated in FIGS. 2A and 2E. In generating the association response message or the reassociation response message at step 128, the AP 24 will insert a NULL into either the IP address field 86 of the association response message or the IP address field 114 of the reassociation response message. Upon detecting the NULL inserted into the IP address field 86 of the association response message or the IP address field 114 of the reassociation response message, the mobile terminal 12 will determine that it has remained in its prior IP domain and may continue to use its current IP address. The mobile terminal 12 having determined, at step 128, that it may continue to use its current IP address, the method would then end at step 130.

Returning to step 126, if, however, it is determined by the AP that the current IP address of the mobile terminal 12 received as part of the association request message or reassociation request message does not match the IP address for the AP 24, the AP 24 determines that the mobile terminal 12 has changed IP domains and needs a new IP address. The method will then proceed to step 132 where the AP 24 sends the MAC address and the IP address for the mobile terminal to the AR 18. In turn, the AR 18, which maintains MAC address caches for neighboring APs (here, the APs 26 and 28) which, together with the AP 24, collectively define the IP domain 14, checks the MAC address caches for a duplicate of the received MAC address. If the AR 18 sees a duplicate of the MAC address of the mobile terminal 12 in the MAC address caches, the AR 18 refuses the association or reassociation request message of the mobile terminal 12.

If, however, there is no duplicate of the MAC address, then the association or reassociation request message will be accepted and the AR 18/AP 24 shall assign a new IP address for the mobile terminal 12 in the manner set forth below.

If the mobile already has an IPv6 address, only the subnet prefix will be modified since it has changed its domain. If the mobile terminal 12 is receiving an address for the first time, then the IP address will be constructed using the subnet prefix and the mobile's 48-bit MAC address extended to a 64-bit EUI interface identifier as described in IETF's standard RFC 2373 and inserted into either the IP address field 86 of the association response message or the IP address field 114 of the reassociation response message. The AP 24 will then forward the association response message or the reassociation response message to the mobile terminal 12. Upon examining the received association response message or reassociation response message and determining that an IP address was inserted into the IP address field 86 of the association response message or the IP address field 114 of the reassociation response message, the mobile terminal 12 will determine that it has changed IP domains and must discontinue usage of its current IP address in favor of the IP address received in the association response message or reassociation response message. The mobile terminal 12 having commenced usage of the newly received IP address, the method would then end at step 130.

The foregoing method will now be described one last time, this time presuming that the mobile terminal is operating in a MIPv6 environment. Once again, the method commences at step 120 with the AP 24 having knowledge of its IP address, the mobile terminal 12 having knowledge of its IP address and the mobile terminal 12 constructing either an association request of a reassociation request message containing the IP address of the mobile terminal 12 in the current IP address field thereof and an enabled mobile IP bit. The method then proceeds to step 122 where the mobile terminal 12 forwards the constructed association request message or reassociation request message to the AP 24. Continuing on to step 124, the AP 24 determines the current IP address of the mobile terminal 12 by checking the current IP address field 74 of the received association request message or the current IP address field 102 of the received reassociation request message.

At step 126, the AP 24 determines whether the mobile terminal 12 has roamed into a new IP domain. To do so, the AP 24 compares the current IP address of the mobile terminal 12 received as part of the association request message or reassociation request message to the IP address for the AP 24. If the addresses match, the AP 24 determines that the mobile terminal 12 has stayed in its prior IP domain and that a new IP address is not necessary. Accordingly, the method will proceed to step 128 where the AP 24 generates an association response message or a reassociation response message. In generating the association response message or the reassociation response message at step 128, the AP 24 will insert a NULL into either the IP address field 86 of the association response message or the IP address field 114 of the reassociation response message. Upon detecting the NULL inserted into the IP address field 86 of the association response message or the IP address field 114 of the reassociation response message, the mobile terminal 12 will determine that it has remained in its prior IP domain and may continue to use its current IP address. The mobile terminal 12 having determined, at step 128, that it may continue to use its current IP address, the method would then end at step 130.

Returning to step 126, if, however, it is determined by the AP that the current IP address of the mobile terminal 12 received as part of the association request message or reassociation request message does not match the IP address for the AP 24, the AP 24 determines that the mobile terminal 12 has changed IP domains and needs a new IP address. The method will then proceed to step 132 where the AP 24 sends the MAC address and the IP address for the mobile terminal to the AR 18. In turn, the AR 18, which maintains MAC address caches for neighboring APs (here, the APs 26 and 28) which, together with the AP 24, collectively define the IP domain 14, checks the MAC address caches for a duplicate of the received MAC address. If the AR 18 sees a duplicate of the MAC address of the mobile terminal 12 in the MAC address caches, the AR 18 refuses the association or reassociation request message of the mobile terminal 12. If, however, there is no duplicate of the MAC address, then the association or reassociation request message will be accepted and the AR 18/AP 24 shall assign a new IP address for the mobile terminal 12 in the manner set forth below.

If the mobile already has an IPv6 address, only the subnet prefix will be modified since it has changed its domain. If the mobile terminal 12 is receiving an address for the first time, then the IP address will be constructed using the subnet prefix and the mobile's 48-bit MAC address extended to a 64-bit EUI interface identifier as described in IETF's standard RFC 2373 and inserted into either the IP address field 86 of the association response message or the IP address field 114 of the reassociation response message. The AP 24 will then forward the association response message or the reassociation response message to the mobile terminal 12. Upon examining the received association response message or reassociation response message and determining that an IP address was inserted into the IP address field 86 of the association response message or the IP address field 114 of the reassociation response message, the mobile terminal 12 will determine that it has changed IP domains and must discontinue usage of its current IP address in favor of the IP address received in the association response message or reassociation response message. The mobile terminal 12 having commenced usage of the newly received IP address, the method would then end at step 130.

Thus, there has been described and illustrated herein, an address acquisition technique in which IP address assignments are encapsulated into association and reassociation messages. By doing so, mobile Layer-2 entities generate less network traffic and consume less power than prior mobile Layer-2 entities. However, those skilled in the art should recognize that numerous modifications and variations may be made in the techniques disclosed herein without departing substantially from the spirit and scope of the invention. Accordingly, the scope of the invention should only be defined by the claims appended hereto.

What is claimed is:

1. In a wireless local area network ("WLAN") which includes a Layer-2 entity, a method for assigning an internet protocol ("IP") address to a mobile terminal upon entering a basic service area ("BSA") served by said Layer-2 entity, comprising:

said Layer-2 entity determining, on behalf of said mobile terminal, whether said mobile terminal should continue using a current IP address or begin using a new IP address; and if said Layer-2 entity determines that said mobile terminal should continue using said current IP address, said Layer-2 entity issuing an instruction, to said mobile terminal, to continue using said current IP address; and said mobile terminal issuing a Layer-2 service request to said Layer-2 entity upon entering said BSA;

said Layer-2 entity determining whether said mobile terminal should continue using said current IP address or begin using a new IP address from said Layer-2 entity, wherein said Layer-2 service request is formatted to include a current IP address field.

2. The method of claim 1, wherein said Layer-2 service request is formatted to include a mobile IP bit.

3. The method of claim 1, and further comprising:

said Layer-2 entity issuing, to said mobile terminal, a response to said Layer-2 service request; and wherein:

if said Layer-2 entity determined that said mobile terminal must continue using said current IP address, said response to said Layer-2 service request shall contain an indication that said mobile terminal must continue using said current IP address; and if said Layer-2 entity determined that said mobile terminal must begin using said new IP address, said response to said Layer-2 service request shall contain said new IP address.

4. The method of claim 3, wherein said response to said Layer-2 service request is formatted to include a current IP address field.

5. The method of claim 4, and further comprising:

if said Layer-2 entity determines that said mobile terminal must continue using said current IP address, said Layer-2 entity placing a NULL in said current IP address field of said response to said Layer-2 service request.

6. The method of claim 4, wherein said WLAN further includes a Layer-3 entity and further comprising:

if said Layer-2 entity determined that said mobile terminal must begin using said new IP address, said Layer-2 entity issuing a request, to said Layer-3 entity, for said new IP address; and upon receiving said new IP address, said Layer-2 entity placing said new IP address in said current IP address field of said response to said Layer-2 service request.

7. The method of claim 6, wherein said Layer-2 entity receives said new IP address from said Layer-3 entity.

8. The method of claim 6, wherein said Layer-2 service request is an association request message and said response to said Layer-2 service request is an association response message.

9. The method of claim 6, wherein said Layer-2 service request is a reassociation request message and said response to said Layer-2 service request is a reassociation response message.

10. A wireless local area network ("WLAN") system providing wireless communication for a mobile terminal, comprising:

a Layer-2 entity;

a basic service area ("BSA") served by said Layer-2 entity, said mobile terminal issuing a service request receivable at said Layer-2 entity upon entering said BSA for determining an internet protocol ("IP") address assignment, wherein said access service request is formatted to include a currently assigned IP address field;

said Layer-2 entity determining whether said mobile terminal should continue using a currently assigned IP address or begin using a new IP address issued through said Layer-2 entity.

11. The system of claim 10, wherein if said Layer-2 entity determines that said mobile terminal should continue using said currently assigned IP address, said Layer-2 entity issuing an instruction, to said mobile terminal, to continue using said current IP address.

12. The system of claim 10, wherein said Layer-2 entity further for issuing, to said mobile terminal, a response to said service request; and wherein:

if said Layer-2 entity determines that said mobile terminal must continue using said current IP address, said response to said service request shall contain an indication that said mobile terminal is to continue using said currently assigned IP address; and if said access entity determines that said mobile terminal should begin using said new IP address, said response to said service request shall contain said new IP address.

* * * * *